United States Patent
Uchiyama et al.

(10) Patent No.: US 7,223,451 B2
(45) Date of Patent: May 29, 2007

(54) POLYCARBONATE-BASED ORIENTED FILM AND RETARDATION FILM

(75) Inventors: Akihiko Uchiyama, Hino (JP); Yuhei Ono, Hino (JP); Yoshinori Ikeda, Hino (JP)

(73) Assignee: Teijin Limited, Osaka (JP)

(*) Notice: Subject to any disclaimer, the term of this patent is extended or adjusted under 35 U.S.C. 154(b) by 350 days.

(21) Appl. No.: 10/487,765

(22) PCT Filed: Mar. 28, 2003

(86) PCT No.: PCT/JP03/03990

§ 371 (c)(1),
(2), (4) Date: Feb. 26, 2004

(87) PCT Pub. No.: WO2004/003606

PCT Pub. Date: Jan. 8, 2004

(65) Prior Publication Data

US 2005/0163943 A1 Jul. 28, 2005

(30) Foreign Application Priority Data

| Jun. 27, 2002 | (JP) | ............................. 2002-187960 |
| Jul. 26, 2002 | (JP) | ............................. 2002-217992 |
| Jul. 26, 2002 | (JP) | ............................. 2002-217993 |

(51) Int. Cl.
- G02B 5/30 (2006.01)
- C08G 64/06 (2006.01)
- B32B 27/36 (2006.01)
- B29C 55/04 (2006.01)
- B29C 55/12 (2006.01)

(52) U.S. Cl. .................... 428/1.1; 428/1.2; 428/1.31; 428/412; 349/117; 349/123; 528/196; 528/198

(58) Field of Classification Search .............. 428/1.1, 428/1.2, 1.31, 412; 349/117, 118, 123; 528/196, 528/198

See application file for complete search history.

(56) References Cited

U.S. PATENT DOCUMENTS

| 6,565,974 | B1 * | 5/2003 | Uchiyama et al. .......... 428/412 |
| 6,638,582 | B1 * | 10/2003 | Uchiyama et al. .......... 428/1.2 |
| 2003/0043730 | A1 * | 3/2003 | Uchiyama et al. ....... 369/275.5 |
| 2004/0239852 | A1 * | 12/2004 | Ono et al. .................. 349/118 |

FOREIGN PATENT DOCUMENTS

| EP | 1 118 885 A1 | 7/2001 |
| EP | 1 197 768 A1 | 4/2002 |
| JP | 6-25398 A | 2/1994 |
| JP | 6-82624 A | 3/1994 |
| JP | 7-52270 A | 2/1995 |
| JP | 7-246661 A | 9/1995 |
| JP | 2000-162419 A | 6/2000 |
| JP | 2001-318232 A | 11/2001 |
| JP | 2001-318233 A | 11/2001 |

OTHER PUBLICATIONS

English translation by computer for JP 2001-318232, http://www4.ipdl.ncipi.go.jp/Tokujitu/PAJdetail.ipdl?N0000=60&N0120=01&N2001=2&N3001=2001-318232.*

K. Ohmuro, S. Kataoka, T. Sasaki, and Y. Koike, 33.3: Development of Super-High-Image-Quality Vertical-Alignment-Mode LCD, 1997 Society for Information Display International Symposium Digest of Technical Papers, pp. 845-848.

* cited by examiner

*Primary Examiner*—Shean C Wu
(74) *Attorney, Agent, or Firm*—Sughrue Mion, PLLC

(57) ABSTRACT

A uniaxially or biaxially oriented film which is made from a specific polycarbonate having a fluorene ring and a glass transition temperature of 165° C. or higher and which has a heat shrinkage factor when it is heated at 90° C. for 500 hours of 0.1% or less, and a ratio of retardation R(450) within the film plane at a wavelength of 450 nm to retardation R(550) within the film plane at a wavelength of 550 nm of 1 to 1.06. This film can be used in a high-quality liquid crystal display device such as a vertical alignment liquid crystal display device and is useful as a retardation film which almost solves a frame problem.

11 Claims, 3 Drawing Sheets

POLYCARBONATE-BASED ORIENTED FILM AND RETARDATION FILM

TECHNICAL FIELD

The present invention relates to a polycarbonate-based oriented film and a retardation film. More specifically, it relates to a polycarbonate-based oriented film which is suitably used as a retardation film for liquid crystal display devices and a retardation film as one of its uses.

BACKGROUND ART

A retardation film is used in an STN (Super Twisted Nematic) liquid crystal display device or the like to solve problems such as color compensation and the expansion of viewing angle. As the material of a retardation film for color compensation has been used a polycarbonate, polyvinyl alcohol, polysulfone, polyether sulfone or amorphous polyolefin. Liquid crystalline polymer and discotic liquid crystals have also been used as the material of a retardation film for the expansion of viewing angle in addition to the above materials.

A vertical alignment liquid crystal display device in which liquid crystals are aligned almost vertically to a substrate when voltage is off has already been used in monitors and TVs due to its high contrast and wide viewing angle. It is described in the 1997 Society for information display international symposium digest of technical papers at pages 845 to 848 that the use of a retardation film is important to obtain a wide viewing angle.

A retardation film made from a polycarbonate homopolymer produced from bisphenol A as a starting material has been widely used in the above STN liquid crystal display device.

However, as especially a vertical alignment liquid crystal display device has higher quality than an STN liquid crystal display device, it has been found that a retardation film made from a polycarbonate material which has been used in the conventional STN liquid crystal display device cannot obtain sufficiently high display quality. That is, the retardation value and the optical axis of a retardation film are changed by stress in the step of joining together a retardation film made from a polycarbonate homopolymer and a polarizer film, stress in the step of joining the laminated polarizer film obtained in the above step to a liquid crystal display device, or the shrinkage stress of a polarizer film which is produced during a durability test at a high temperature or at a high temperature and a high humidity, with the result that the brightness of the screen of the liquid crystal display device becomes nonuniform particularly when black is displayed on the entire screen, thereby deteriorating display quality. The place where this brightness nonuniformity appears which depends on the mode of the liquid crystal display device is around the edges of the four sides of the screen of the liquid crystal display device in most cases. Therefore, this phenomenon will be referred to as "frame phenomenon" and this problem will be referred to as "frame problem" in this description hereinafter.

Cellulose acetate, polyolefin and polycarbonate are known as the material of the retardation film.

However, a retardation film made from cellulose acetate has poor stability of molecular orientation as cellulose acetate has a high water absorption coefficient, thereby making it difficult to use it when a high degree of orientation is required within the plane and to suppress variations in anisotropy within the plane for the same reason. Since a polyolefin having a cyclic skeleton such as a norbornene skeleton has a low photoelastic constant and low intrinsic birefringence, it must be stretched at a high draw ratio to obtain a retardation required for a retardation film. Since a bulky molecular structure such as a norbornene skeleton is employed to obtain a high glass transition point, a retardation film made from the polyolefin has low impact resistance, handling ease and stretchability, easily breaks and often ruptures. Therefore, this film has a lot of problems to be solved when it is produced or used as a retardation film.

Meanwhile, a polycarbonate comprising an aromatic dihydroxy compound (bisphenol) having two aromatic rings through a bond group out of aromatic polycarbonates has appropriate flexibility and a high glass transition point. However, a homopolymer having a bisphenol A skeleton which is widely used in an STN mode has no problem with handling ease and stretchability but does have the above frame problem. Therefore, it is difficult to use it in a vertical alignment liquid crystal display device which must have high quality.

There are many kinds of polycarbonates and there are a large number of examples in which the polycarbonates are used as retardation films. JP-A 7-246661 and JP-A 6-82624 (the term "JP-A" as used herein means an "unexamined published Japanese patent application") propose retardation films made from a polycarbonate comprising a dihydroxy component other than a bisphenol A skeleton.

Polycarbonates are divided into aliphatic and aromatic polycarbonates. In general, aliphatic polycarbonates are not used as the material of a retardation film because they have a low glass transition temperature and poor productivity though they have a low photoelastic constant. One of the causes of the frame phenomenon is that stress generated by the shrinkage of a polarizer spreads to a retardation film through an adhesive layer to change the retardation of the retardation film. Therefore, a retardation film having a lower photoelastic constant is considered to be preferred because a change in retardation caused by stress becomes smaller, which is not a necessary and sufficient condition. Meanwhile, aromatic polycarbonates have high production ease and their glass transition temperatures can be easily raised by the existence of an aromatic ring. As described above, they are actually used as the material of a retardation film but they have a problem that their photoelastic constants are relatively high. Attempts have already been made to reduce the photoelastic constant of an aromatic polycarbonate film, and some homopolymers and copolymers are proposed.

However, in the case of these aromatic polycarbonates, though the reason is not clear, probably due to the existence of an aromatic ring, it is difficult to reduce the photoelastic constants of the aromatic polycarbonates to the level of a commercially available optical film made from a polyolefin having a bulky functional group such as the above norbornene skeleton. That is, although polycarbonates are superior to the above polyolefin in handling ease and moldability, it is difficult to reduce their photoelastic constants while realizing a high glass transition temperature.

JP-A 6-25398 discloses a polycarbonate resin having a high refractive index and low birefringence which comprises a structural unit represented by the following formula (a):

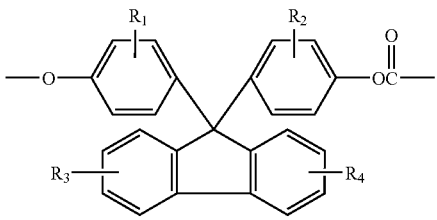

(a)

wherein $R_1$ to $R_4$ are each a hydrogen atom, halogen atom, phenyl group or alkyl group having 1 to 3 carbon atoms, and a structural unit represented by the following formula (b):

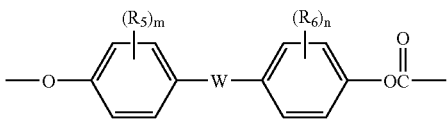

(b)

wherein w is a single bond, alkylidene group, cycloalkylidene group, phenyl substituted alkylidene group, sulfone group, sulfide group or oxide group, $R_5$ and $R_6$ are each a hydrogen atom, halogen atom, phenyl group or alkyl group having 1 to 3 carbon atoms, and m and n are each an integer of 1 to 4, and which contains the structural unit (b) in an amount of 41 to 95 mol %. It is disclosed in Examples of the above publication that polycarbonates (powders) produced by the solution polymerization of 9,9-bis(4-hydroxyphenyl)fluorene and bisphenol A in molar ratios of 85/15 (Example 1), 75/25 (Example 2) and 50/50 (Example 3) are dissolved in methylene chloride to obtain films. However, the publication is silent about uniaxially oriented or biaxially oriented films made from the above polycarbonates and therefore about retardation films composed of these films as well.

JP-A 2001-318232 discloses an optical film which is made from a polycarbonate containing 1 mol % or more of a recurring unit represented by the following formula (c):

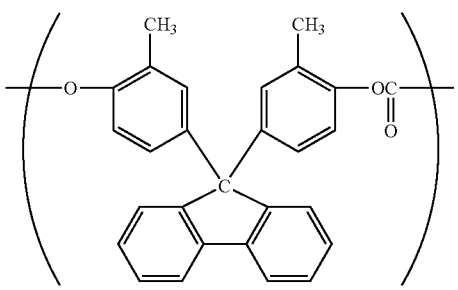

(c)

and having a glass transition temperature of 160° C. or higher, and which has a heat shrinkage factor when heated at 80° C. for 500 hours of 0.07% or less, a hardness measured by a super microhardness meter of 16 kg/mm² or more, a thickness of 10 to 200 μm and a retardation (R(550)) at a wavelength of 550 nm satisfying |R(550)|≦20 nm. It is disclosed in Example 7 of the above publication that a polycarbonate copolymer produced by the solution polymerization of 30 mol % of a bisphenol compound represented by the following formula:

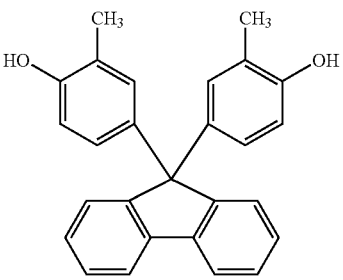

and 70 mol % of bisphenol A is dissolved in methylene chloride to obtain a cast film which is then stretched uniaxially to 1.5 times at 196° C. to obtain an optical film having an R(550) of 5.0 nm.

DISCLOSURE OF THE INVENTION

It is an object of the present invention to provide a polycarbonate-based oriented film which is suitably used as a retardation film for liquid crystal display devices.

It is another object of the present invention to provide a polycarbonate-based oriented film which is suitably used as a retardation film having various optical anisotropies required for vertical alignment liquid crystal display devices.

It is still another object of the present invention to provide a retardation film which can almost solve the frame problem and can provide excellent viewing angle characteristics when it is used in a large-sized liquid crystal display device having a display area of 15 inches or more, particularly a large-sized vertical alignment liquid crystal display device which makes it more difficult to solve the above frame problem due to the large area of its polarizer film.

Other objects and advantages of the present invention will become apparent from the following description.

According to the present invention, firstly, the above objects and advantages of the present invention are attained by a uni- or bi-axially oriented film (A) which comprises a polymer or polymer mixture containing a recurring unit represented by the following formula (I):

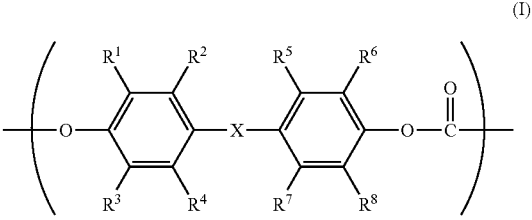

(I)

wherein $R^1$ to $R^8$ are each independently a member selected from the group consisting of hydrogen atom, halogen atom, hydrocarbon group having 1 to 6 carbon atoms and hydrocarbon-O-group having 1 to 6 carbon atoms, and X is a group represented by the following formula (I)-1:

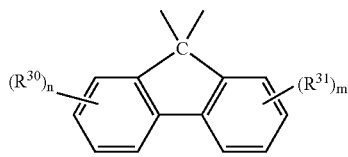

(I)-1 wherein $R^{30}$ and $R^{31}$ are each independently a halogen atom or alkyl group having 1 to 3 carbon atoms, and n and m are each independently an integer of 0 to 4, the polymer and the polymer mixture containing the recurring unit represented by the above formula (I) in an amount of 30 to 60 mol % based on the total of all the recurring units of the polymer or polymer mixture and having a glass transition temperature of 165° C. or higher, (B) which has a heat shrinkage factor when it is heated at 90° C. for 500 hours under no load of 0.1% or less, and (C) which satisfies the following expression (1):

$$1 \leq R(450)/R(550) \leq 1.06 \quad (1)$$

wherein R(450) and R(550) are retardations within the film plane at wavelengths of 450 nm and 550 nm, respectively.

According to the present invention, secondly, the above objects and advantages of the present invention are attained by a retardation film which is the above uniaxially or biaxially oriented film of the present invention.

That is, the inventors of the present invention have conducted intensive studies, paying attention to the molecular structure of a polycarbonate material and the physical properties of a retardation film in order to use a polycarbonate which is superior to a cyclopolyolefin having a bulky functional group such as the above norbornene skeleton in handling ease and stretchability in a retardation film for vertical alignment liquid crystal display devices and have found that control factors other than the photoelastic constant of the retardation film are important as one of the causes of the above frame problem. When they have conducted further studies, they have found that the frame phenomenon can be reduced by controlling some of the factors such as the molecular structure, glass transition temperature and heat shrinkage factor of a polycarbonate in use even though its photoelastic constant is high and that the polycarbonate can be used in a retardation film for vertical alignment liquid crystal display devices satisfactorily. The present invention has been accomplished based on these findings.

BEST MODE FOR CARRYING OUT THE INVENTION

Figure 1:
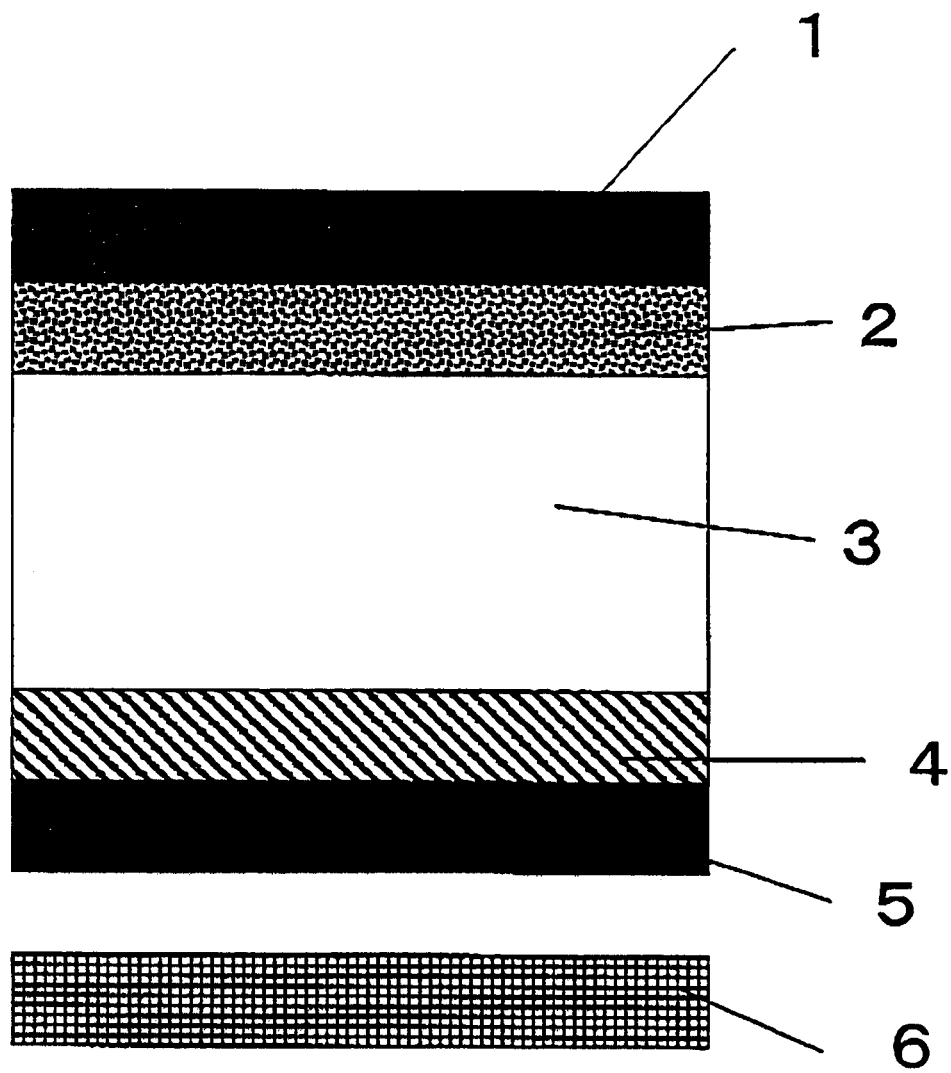
FIG. 1 is a schematic sectional view of an example of a vertical alignment liquid crystal display device comprising the oriented film of the present invention as a retardation film.

A polymer which is the material of a retardation film used in the present invention is a specific polycarbonate having a fluorene ring. That is, the polymer is a polycarbonate which comprises a recurring unit represented by the following formula (I) in an amount of 30 to 60 mol %, preferably more than 30 mol % and 60 mol % or less based on the total of all the recurring units constituting the polycarbonate:

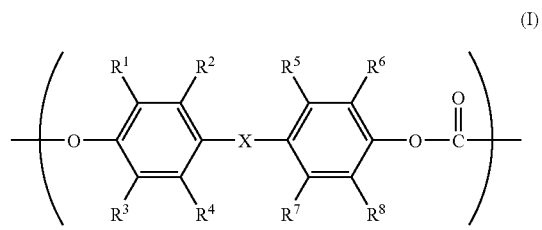

(I)

In the above formula (I), $R^1$ to $R^8$ are each independently at least one member selected from the group consisting of hydrogen atom, halogen atom, hydrocarbon group having 1 to 6 carbon atoms and hydrogen-O-group having 1 to 6 carbon atoms. Examples of the hydrocarbon group include alkyl groups such as methyl group and ethyl group, and aryl groups such as phenyl group. A polycarbonate of the formula (I) in which one of $R^1$ and $R^3$ is a hydrogen atom, the other is a methyl group, one of $R^6$ and $R^8$ is a hydrogen atom and the other is a methyl group is excellent in handling ease and the like.

X is a group (fluorene component) represented by the following formula.

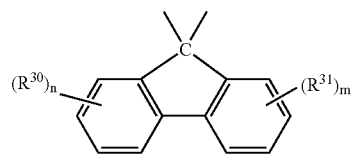

$R^{30}$ and $R^{31}$ are each independently a halogen atom or alkyl group having 1 to 3 carbon atoms such as methyl group. n and m are each an integer of 0 to 4.

A preferred polycarbonate material comprises a recurring unit represented by the above formula (I) and a recurring unit represented by the following formula (II), and the recurring unit represented by the above formula (I) is contained in an amount of 35 to 60 mol % based on the total of the recurring units (I) and (II):

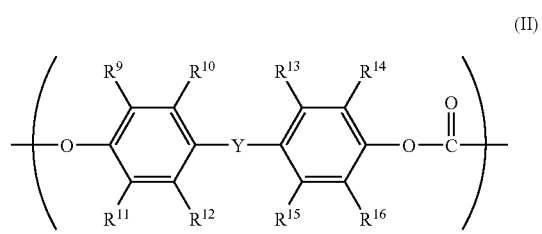

(II)

In the above formula (II), $R^9$ to $R^{16}$ are each independently at least one member selected from the group consisting of hydrogen atom, halogen atom and hydrocarbon group having 1 to 22 carbon atoms, and Y is at least one member selected from the group consisting of

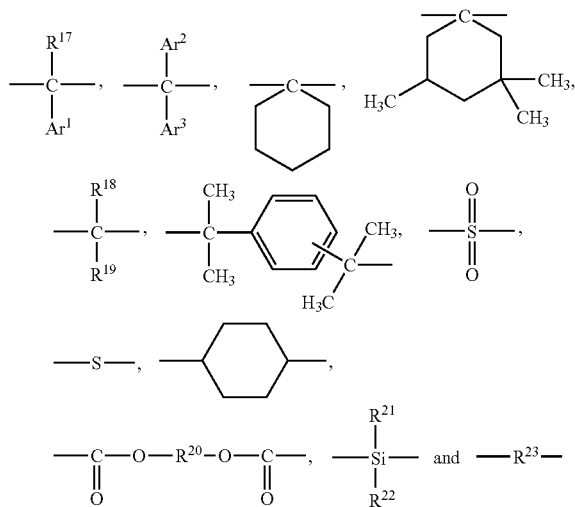

$R^{17}$ to $R^{19}$, $R^{21}$ and $R^{22}$ in Y are each independently a hydrogen atom, halogen atom, alkyl group or hydrocarbon group having 1 to 22 carbon atoms such as aryl group, $R^{20}$ and $R^{23}$ are each independently an alkyl group or hydrocarbon group having 1 to 20 carbon atoms such as aryl group, and $AR^1$ to $AR^3$ are each independently an aryl group having 6 to 10 carbon atoms such as phenyl group.

More preferably, the above polycarbonate is a polycarbonate which comprises a recurring unit represented by the following formula (III) in an amount of 45 to 55 mol % based on the total of all the recurring units and a recurring unit represented by the following formula (IV) in an amount of 55 to 45 mol % based on the total of all the recurring units.

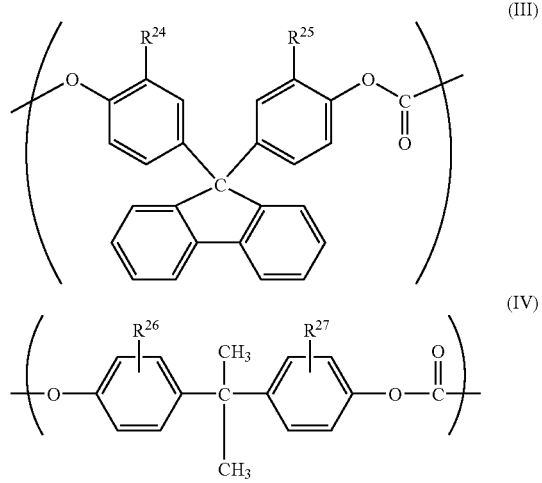

In the above formula (III), $R^{24}$ and $R^{25}$ are each independently a hydrogen atom or methyl group. Preferably, $R^{24}$ and $R^{25}$ are both methyl groups.

In the above formula (IV), $R^{26}$ and $R^{27}$ are each independently a hydrogen atom or methyl group. Preferably, $R^{26}$ and $R^{27}$ are both hydrogen atoms.

The above polycarbonate may be a copolymer or a polymer mixture (blend or blend polymer). It may be a mixture of two or more copolymers, a mixture of two or more homopolymers, or a mixture of a homopolymer and a copolymer.

When the amount of the recurring unit of the above formula (I) is larger than 60 mol %, it may be difficult to satisfy the following expression (1) which shows the above retardation wavelength dispersion characteristics. When the amount is smaller than 30 mol %, it is difficult not only to satisfy the above expression (1) but also to obtain a glass transition temperature of 165° C. or higher. To solve the frame problem in the present invention, the glass transition temperature must be 165° C. or higher, preferably 200° C. or higher. The photoelastic constant is preferably low in order to solve the frame problem. When the glass transition temperature is low, the frame problem may occur. For example, even when the photoelastic constant at room temperature is as low as about $10 \times 10^{-8}$ cm$^2$/N or less, the frame problem may occur. Meanwhile, the film of the present invention may have a photoelastic constant at room temperature of about $30 \times 10^{-8}$ cm$^2$/N or more but still it can suppress the frame phenomenon. Even when the film has a recurring unit of the above formula (I), if it does not have a glass transition temperature of 165° C. or higher, its frame phenomenon may become problematic.

The above molar ratio can be obtained from the whole bulk of the polycarbonate constituting the polymer with a nuclear magnetic resonance (NMR) device, for example, whether it is a copolymer or blend polymer.

The above copolymer and/or blend polymer can be produced by a known method. The polycarbonate is advantageously produced by the melt polycondensation or solid-phase polycondensation of a dihydroxy compound and phosgene. In the case of a blend, a compatible blend is preferred but when components are not completely compatible with each other, if refractive indices of the components are made the same, optical scattering between the components can be suppressed and thereby transparency can be improved.

The reason why a glass transition temperature of 165° C. or higher, preferably 200° C. or higher is one of the important factors for attaining the object of the present invention, that is, the suppression of the frame phenomenon is not fully known. All the causes of the frame phenomenon are also not fully known. However, at least the development of optical anisotropy of a retardation film by stress is considered as one of the causes and to be connected with the movement of the molecular chain of a polymer material forming the retardation film. Since the temperature at which a liquid crystal display device is used and the temperature applied to a retardation film on a liquid crystal display device in the production process are generally about room temperature ±50° C., it is considered that as the difference between the device use temperature/the process temperature and the glass transition temperature increases, molecular movement at around room temperature lowers and the frame phenomenon can be reduced more. The term "molecular movement" includes macroscopic molecular movement such as the creep phenomenon of polymer.

As one of the causes of the frame phenomenon is connected with the molecular movement of the above polycarbonate material for forming a retardation film as described above, the molecular weight of the material is preferably within a certain range. The intrinsic viscosity indicative of molecular weight is preferably 0.4 to 1.1 dl/g, more preferably 0.5 to 1.0 dl/g. Although the intrinsic viscosity is preferably higher from the viewpoint of the molecular movement of polymer which causes the frame phenomenon, if it is too high, there occurs a problem with the moldability of a film, or mass productivity is reduced by a rise in viscosity in the step of polymerizing a polymer. Therefore, it is preferred to maintain the intrinsic viscosity at the above range.

The oriented film of the present invention may be a uniaxially oriented film or a biaxially oriented film.

The oriented film of the present invention can be produced by stretching an unstretched film. To produce the unstretched film, a known melt extrusion method or solution casting method is used but a solution casting method is preferred from the viewpoints of film thickness nonuniformity and appearance. The solvent used in the solution casting method is preferably methylene chloride or dioxolane.

Uniaxial orientation may be either longitudinal orientation or transverse orientation, or either uniaxial orientation with a free width or uniaxial orientation with a fixed width. Biaxial orientation may be sequential biaxial orientation or simultaneous biaxial orientation. Sequential biaxial orientation may be carried out by stretching in a transverse direction after stretching in a longitudinal direction, or vice versa.

To improve stretchability, the film may contain a known plasticizer exemplified by phthalates such as dimethyl phthalate, diethyl phthalate and dibutyl phthalate, phosphates such as tributyl phosphate, aliphatic dibasic esters, glycerin derivatives and glycol derivatives. At the time of stretching, the organic solvent used to produce a film may remain in the film. The amount of the organic solvent is preferably 1 to 20 wt % based on the material of the oriented film.

The oriented film of the present invention must have a heat shrinkage factor of 0.1% or less when it is heated at 90° C. for 500 hours. The reason for this is considered to be as follows. Since heat shrinkage is considered to be the result of long-time molecular movement as described above, it is assumed that the retardation of a film having a large heat shrinkage factor changes for a long time even when it is alone. The dimensional change of the film itself produces stress between it and glass or other optical film in contact therewith through an adhesive layer with the result that a retardation change is induced and leads to the occurrence of the frame phenomenon. When the inventors of the present invention have conducted intensive studies, they have found that the frame phenomenon can be further suppressed when the heat shrinkage factor of the film when it is heated at 90° C. for 500 hours is 0.1% or less in addition to the above other factors of suppressing the frame phenomenon. It is presumed that when the temperature of the actual use environment to be applied to the retardation film is considered to be about 80° C. at maximum in consideration of heat from a backlight in a liquid crystal display device such as a liquid crystal TV or liquid crystal monitor, there will be no problem. That is, the temperature 90° C. is set by adding a margin of 10° C. to 80° C. which is presumed to be the highest temperature of the actual use environment. The heat shrinkage factor of a retardation film differs according to a direction for measuring it within the film plane. A specific measuring method will be described in Examples and limited by a heat shrinkage factor in a slow axis direction having the largest refractive index within the film plane. The heat shrinkage factor is preferably 0.08% or less.

An oriented film made from an amorphous polymer such as a polycarbonate tends to have larger heat shrinkage than an unoriented film made from the same polymer. To reduce heat shrinkage, for example, a material and production method must be worked out. It should be noted that the above-described specific polycarbonate is a material having small heat shrinkage and excellent dimensional stability when it is heated after it is stretched.

The oriented film of the present invention must further satisfy the following expression (1):

$$1 \leq R(450)/R(550) \leq 1.06 \tag{1}$$

wherein R(450) and R(550) are retardations within the film plane at wavelengths of 450 nm and 550 nm, respectively.

In a vertical alignment mode liquid crystal display device, since liquid crystals are aligned substantially vertically at the time of displaying black when voltage is off, to obtain a good viewing angle by optically compensating this, the oriented film of the present invention preferably satisfies the following expressions (2) and (3) when it is a uniaxially oriented film:

$$R(550) > K(550) \tag{2}$$

$$R(550) > 20 \text{ nm} \tag{3}$$

wherein R(550) is as defined in the above expression (1) and K(550) is a value (nm) defined by the following expression (4) at a wavelength of 550 nm:

$$K = [(n_x + n_y)/2 - n_z] \times d \tag{4}$$

wherein $n_x$, $n_y$ and $n_z$ are refractive indices in x, y and z axis directions of the film, respectively, and d is the thickness (nm) of the film.

The biaxially oriented film of the present invention preferably satisfies the following expression (2') and the above expression (3):

$$R(550) \leq K(550) \tag{2'}$$

wherein R(550) and K(550) are as defined in the above expressions, or the above expression (2') and the following expressions (3') and (5) when it is a biaxially oriented film:

$$R(550) \leq 20 \text{ nm} \tag{3'}$$

$$K(550) \geq 50 \text{ nm} \tag{5}$$

wherein R(550) and K(550) are as defined in the above expressions.

The biaxially oriented film which satisfies the above expressions (2') and (3) more preferably satisfies the following expression (1') in place of the above expression (1):

$$1 \leq R(450)/R(550) \leq 1.05 \tag{1'}$$

wherein R(450) and R(550) are as defined in the above expressions.

The oriented film of the present invention which satisfies the above characteristic properties can carry out mainly the optical compensation of a liquid crystal cell layer and a polarizer in a vertical alignment mode as a retardation film.

Further, the uniaxially oriented film of the present invention having the above characteristic properties can carry out the optical compensation of a vertical alignment mode liquid crystal display device well when at least one of the film is combined with at least one other retardation film which satisfies the following expressions (6), (7), (8) and (9) at the same time, preferably one of the film is combined with one other retardation film. In this case, the uniaxially oriented film of the present invention carries out mainly the compensation of the viewing angle of a polarizer film for a vertical alignment mode liquid crystal display device whereas the other retardation film which satisfies the following expressions (6), (7), (8) and (9) at the same time carries out mainly the optical compensation of a liquid crystal cell.

$$1 \leq R(450)/R(550) \leq 1.06 \quad (6)$$

$$R(550) \leq K(550) \quad (7)$$

$$R(550) \leq 20 \text{ nm} \quad (8)$$

$$K(550) \geq 50 \text{ nm} \quad (9)$$

wherein R(450), R(550) and K(550) are as defined in the above expressions.

It is particularly preferred to use the biaxially oriented film of the present invention having the above characteristic properties in conjunction with other uniaxially anisotropic retardation film which satisfies the following expression (10):

$$R(550) = 2 \times K(550) \quad (10)$$

in a vertical alignment mode in order to expand the viewing angle of a liquid crystal display device.

Wavelength dispersion characteristics are also important from the viewpoint of the optical compensation of a vertical alignment mode liquid crystal display device. The oriented film of the present invention must satisfy the above expression (1), preferably the following expression (1″) from the viewpoints of matching with the wavelength dispersion of liquid crystals and the compensation of the viewing angle of a polarizer film:

$$1.01 \leq R(450)/R(550) \leq 1.05 \quad (1″).$$

Particularly in a vertical alignment mode liquid crystal display device comprising a circular polarizer film which generates circularly polarized light, the above expression (1), preferably the above expression (1″) is satisfied. The term "circular polarizer film" denotes a circular polarizer film in which the polarizing axis of a polarizer film and the slow axis of a retardation film are set to 45° or 135°. It is known that a retardation film used in an STN liquid crystal display device preferably has an R(450)/R(550) larger than a value specified by the above expression (1) (more than 1.06) but the above expression (1) is preferably satisfied in a vertical alignment mode liquid crystal display device.

Although the uniaxially oriented film and the biaxially oriented film of the present invention can be produced by uniaxial orientation and biaxial orientation, respectively, as described above, it has been found that a heat shrinkage factor of 0.1% or less can be effectively attained by heating after stretching. As for the heating conditions after stretching, the temperature is preferably in the range of (the glass transition temperature of the oriented film −50° C.) to (the glass transition temperature +30° C.). The retardation film must have a large retardation value. In general, an alignment structure formed by orientation is relaxed by heating to reduce the retardation value in most cases. According to the present invention, to suppress this, the draw ratio is preferably not changed or slightly reduced. Stated more specifically, a reduction in the draw ratio is 0 to 30%, more preferably 1 to 20% of the draw ratio just before reduction. The heating time which depends on the heating temperature is preferably 1 to 200 seconds. The heating for the above orientation includes heating at the end of the stretching step by reducing the draw ratio when the orientation is continuous transverse orientation.

To effectively suppress the frame phenomenon, the change of R(550) after 500 hours of heating at 90° C. is preferably ±3 nm or less. It is more preferably ±2 nm or less. For the evaluation of this, there are changes in the physical properties of the oriented film alone. When this value is large, the frame phenomenon may occur.

As described above, the unstretched film for obtaining the oriented film of the present invention is preferably produced by the solution casting method. In this case, to suppress heat shrinkage, the residue of the solvent in the oriented film is preferably 0.9 wt % or less, more preferably 0.7 wt % or less.

The water absorption coefficient of the polymer material of the oriented film is preferably 1 wt % or less, more preferably 0.8 wt % or less, particularly preferably 0.5 wt % or less. When a polymer having a high water absorption coefficient is used, the frame phenomenon may be seen markedly in a moist heat test.

From the viewpoint of productivity, the oriented film of the present invention as a retardation film can be preferably rolled in which its slow axis within the film plane is existent in a direction parallel to the width direction of the film. In a vertical alignment mode liquid crystal display device, a polarizer film and a retardation film may be joined together with an adhesive layer therebetween in such a manner that the transmission axis of the polarizer film becomes perpendicular or parallel to the slow axis of the retardation film. Since a polarizer film comprising iodine which is widely and generally used is produced by continuous longitudinal uniaxial orientation, its transmission axis is generally existent in a direction perpendicular to the flow direction of a roll. Therefore, in the above vertical alignment mode liquid crystal display device, when the polarizer film and the retardation film are used in such a manner that the transmission axis of the polarizer film and the slow axis of the retardation film become parallel to each other, if a laminated polarizer film can be produced by joining together the polarizer film and the retardation film with an adhesive layer therebetween by a roll-to-roll system, productivity will be greatly improved. To realize this, the slow axis of the rolled retardation film must be existent in the width direction of the film.

The oriented film of the present invention is preferably transparent with a haze value of 3% or less, preferably 1% or less and a total light transmittance of 85% or more, preferably 90% or more.

The oriented film may further contain an ultraviolet light absorber such as phenylsalycylic acid, 2-hydroxybenzophenone or triphenyl phosphate, bluing agent for changing color, antioxidant and the like.

The thickness of the oriented film of the present invention is not limited but preferably 1 to 400 μm. The oriented film and the retardation film of the present invention include what are called "sheet" or "plate".

It is known that a retardation film gives a different retardation value to obliquely input light from straight input light. The 3-D refractive indices of a polymer material are represented by $n_x$, $n_y$ and $n_z$ which are defined as follows.

$n_x$: refractive index in the main stretching direction within the plane of the retardation film $n_y$: refractive index in a direction perpendicular to the main stretching direction within the plane of the retardation film $n_z$: refractive index in the normal direction of the surface of the retardation film.

The expression "main stretching direction" denotes a stretching direction in the case of uniaxial orientation and a stretching direction for improving the degree of orientation in the case of biaxial orientation, or the main orientation direction of the main chain of a polymer in terms of chemical structure. In the present invention, the direction of the maximum refractive index within the plane is called "nx direction" (slow axis). In the present invention, the retardation value R is represented by $R=(n_x-n_y) \times d$ (nm) (d is the thickness (nm) of the film).

The 3-D refractive indices are measured by polarization analysis which is a technique for analyzing the polarization of output light obtained by inputting polarized light to a retardation film. In the present invention, the optical anisotropy of a retardation film is regarded as an index ellipsoid, and the 3-D refractive indices are obtained from a known index ellipsoid expression. Since the 3-D refractive indices have dependence on the wavelength of a light source in use, they are preferably defined by the wavelength of the light source in use.

The retardation film of the present invention can carry out the optical compensation of all kinds of liquid crystal cells such as bend alignment cell, vertical alignment cell, in-plane switching mode cell, twist nematic cell and cholesteric mode cell compensated by an optical compensation film. Further, it may be used as an optical film for use in a liquid crystal projector.

Particularly, the uniaxially oriented film of the present invention preferably satisfies the following expression (11):

$$40 \text{ nm} \leq R(550) \leq 300 \text{ nm} \tag{11},$$

more preferably the following expression (12):

$$50 \text{ nm} \leq R(550) \leq 200 \text{ nm} \tag{12}$$

from the viewpoint of optical compensation as a retardation film for a vertical alignment mode liquid crystal display device.

A retardation film which is the uniaxially oriented film of the present invention satisfying the following expression (13) is effective from the viewpoint of optical compensation:

$$R(550)=2 \times K(550) \tag{13}.$$

As described above, a combination of a retardation film which satisfies the above characteristic properties and another retardation film for carrying out the optical compensation of a liquid crystal cell can carry out mainly the optical compensation of a polarizer film in a vertical alignment mode liquid crystal display device. A retardation film which satisfies the above expressions (2), (11) and (12) can compensate an axial change when light is incident upon the polarizer film obliquely.

The biaxially oriented film of the present invention which satisfies the following expressions (14) and (15):

$$0 \text{ nm} \leq R(550) \leq 10 \text{ nm} \tag{14}$$

$$60 \text{ nm} \leq K(550) \leq 400 \text{ nm} \tag{15},$$

more preferably the following expressions (16) and (17):

$$0 \text{ nm} \leq R(550) \leq 5 \text{ nm} \tag{16}$$

$$70 \text{ nm} \leq K(550) \leq 300 \text{ nm} \tag{17}$$

at the same time is effective from the viewpoint of optical compensation as a retardation film for a vertical alignment mode liquid crystal display device.

With reference to the accompanying drawings, examples of a vertical alignment mode liquid crystal display device comprising the oriented film of the present invention as a retardation film will be described.

FIG. 1 shows a vertical alignment liquid crystal display device comprising a uniaxially oriented film 2 and a biaxially oriented film 4 as optical compensation films. In FIG. 1, reference numeral 1 denotes a polarizer, 2 a uniaxially oriented film, 3 a vertically aligned liquid crystal cell, 4 a biaxially oriented film, 5 a polarizer and 6 a back light. Although numeral 1 in FIG. 1 denotes the polarizer on an observer's side, as the uniaxially oriented film substantially serves as a film for compensating the viewing angle of a polarizer, it is situated preferably at a position closest to the polarizer 1 or 5, more preferably at a position closest to the polarizer 1 as shown in FIG. 1. The uniaxially oriented film 2 preferably satisfies the following expressions (2) and (3):

$$R(550)>K(550) \tag{2}$$

$$R(550)>20 \text{ nm} \tag{3},$$

more preferably the above expression (2) and the following expression (11):

$$40 \text{ nm} \leq R(550) \leq 300 \text{ nm} \tag{11},$$

much more preferably the above expression (2) and the following expression (12):

$$50 \text{ nm} \leq R(550) \leq 200 \text{ nm} \tag{12},$$

particularly preferably the above expressions (2) and (12) and the following expression (13):

$$R(550) \geq 2 \times K(550) \tag{13}.$$

Since the biaxially oriented film 4 in FIG. 1 mainly functions as an optical compensation film for a vertically aligned liquid crystal layer, it preferably satisfies the following expression (2'):

$$R(550) \leq K(550) \tag{2'},$$

more preferably the following expressions (3') and (5):

$$R(550) \leq 20 \text{ nm} \tag{3'}$$

$$K(550) \geq 50 \text{ nm} \tag{5},$$

much more preferably the following expressions (16) and (17):

$$R(550) \leq 5 \text{ nm} \tag{16}$$

$$K(550) \geq 90 \text{ nm} \tag{17}.$$

Two or more films may be used as the biaxially oriented film 4 at the position shown in FIG. 1.

Figure 2:
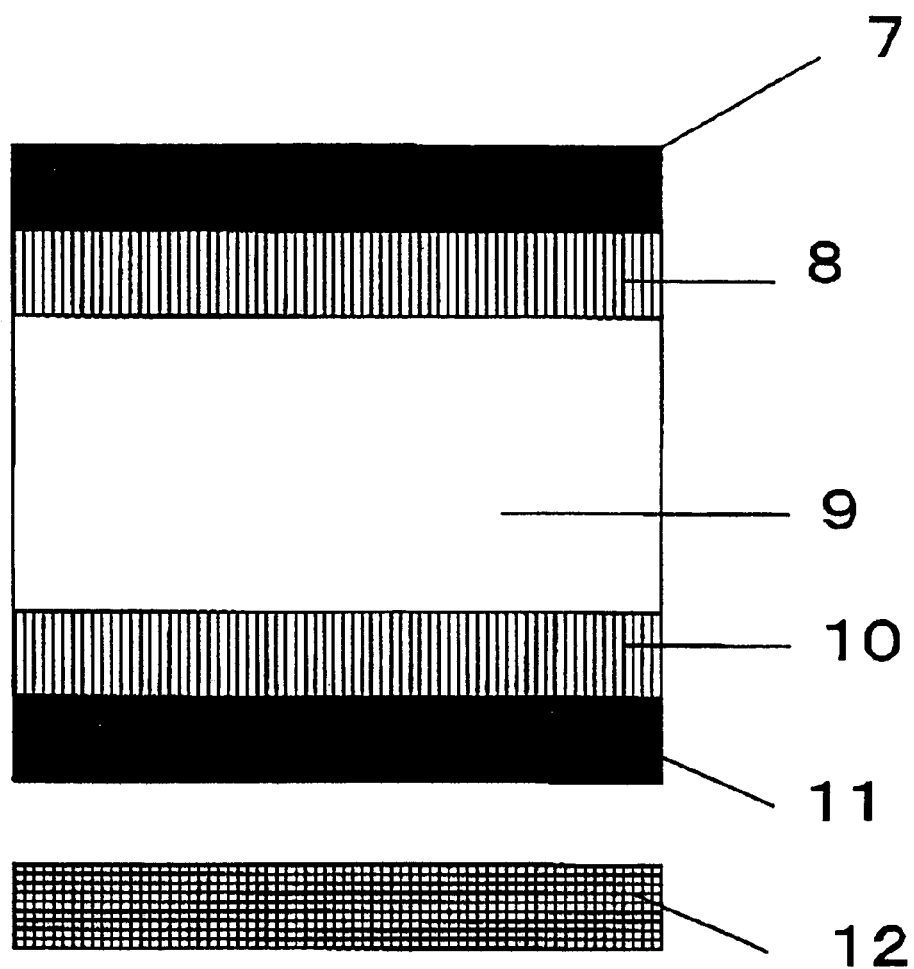
FIG. 2 is a schematic sectional view of another example of a vertical alignment liquid crystal display device comprising the oriented film of the present invention as a retardation film.

FIG. 2 shows a vertical alignment liquid crystal display device comprising two biaxially oriented films. In FIG. 2, reference numeral 7 denotes a polarizer, 8 a biaxially oriented film, 9 a vertically aligned liquid crystal cell, 10 a biaxially oriented film, 11 a polarizer and 12 a back light. In FIG. 2, numerals 8 and 10 preferably denote films having the same characteristic properties. In this case, the compensation of the viewing angles of the liquid crystal layer and the polarizer is carried out with the two films. The biaxially oriented films 8 and 10 preferably satisfy the above expression (2'), more preferably the above expression (2') and the following expression (3):

$$R(0.550)>20 \text{ nm} \tag{3},$$

much more preferably the above expression (2') and the following expressions (18) and (19):

20 nm<R(550)≦300 nm (18)

30 nm≦K(550)≦500 nm (19), particularly preferably the above expression (2') and the following expressions (20) and (21):

20 nm<R(550)≦150 nm (20)

30 nm≦K(550)≦300 nm (21)

at the same time.

Figure 3:
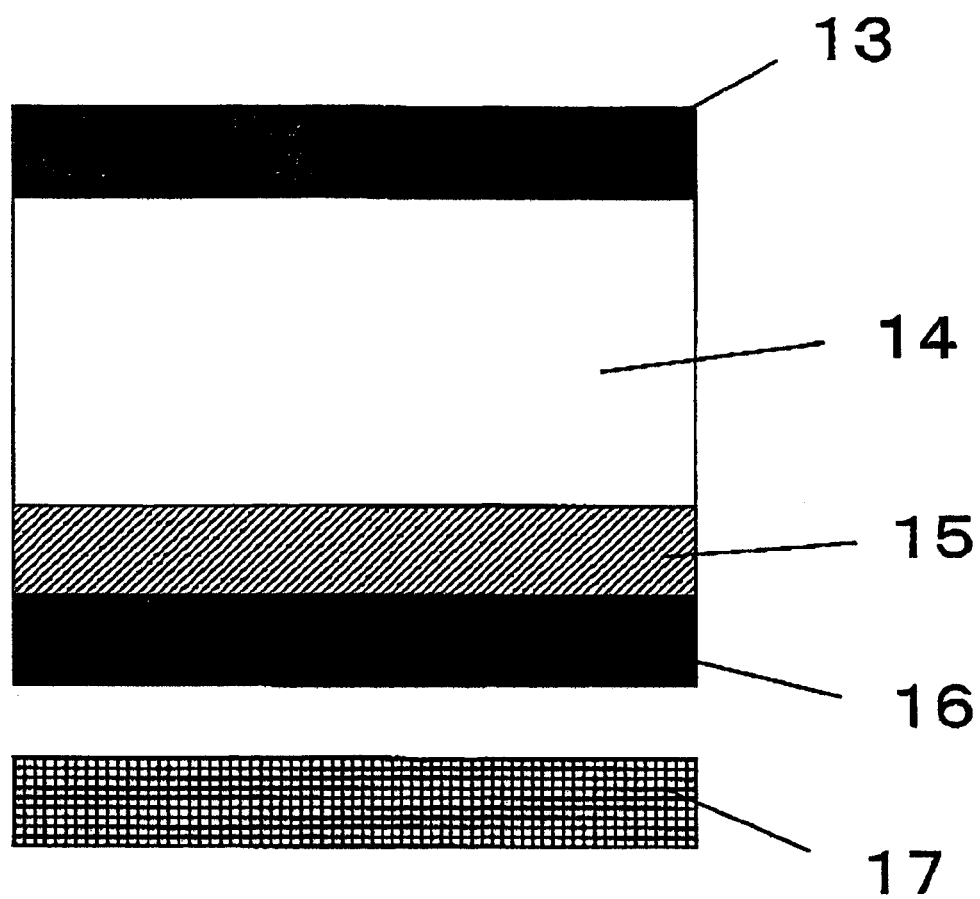
FIG. 3 is a schematic sectional view of still another example of a vertical alignment liquid crystal display device comprising the oriented film of the present invention as a retardation film.

FIG. 3 shows a vertical alignment liquid crystal display device comprising one biaxially oriented film. In FIG. 3, reference numeral 13 denotes a polarizer, 14 a vertically aligned liquid crystal cell, 15 a biaxially oriented film, 16 a polarizer and 17 a back light. The compensation of the viewing angles of the liquid crystal layer and the polarizer is carried out with only one film. The preferred characteristic properties of the biaxially oriented film are the same as the above films of FIG. 2.

A plurality of the retardation films of the present invention may be used in a liquid crystal display device, or the retardation film of the present invention may be used in combination with another retardation film made from a polycarbonate, amorphous polyolefin, polyether sulfone, polycarbonate, polysulfone or cellulose acetate, a substrate coated with polymer liquid crystals, or an aligned and cured discotic liquid crystal layer. They may be combined in the liquid crystal display device or may be combined with a polarizer film.

When the retardation film of the present invention which satisfies these is used in a vertical alignment mode liquid crystal display device, there can be provided a liquid crystal display device having excellent viewing angle characteristics.

The oriented film of the present invention can be advantageously used as a retardation film for not only liquid crystal display devices but also emission devices such as organic electroluminescence devices, plasma displays, field emission devices and CRT's, electrophoresis devices, optical engines for projectors, optical pick-up devices, image pick-up devices, optical arithmetic devices, optical read/write devices and optical read/write media.

EXAMPLES

The following examples are provided for the purpose of further illustrating the present invention but are in no way to be taken as limiting.

(Evaluation Methods)

The characteristic properties of the material described in this text were evaluated by the following methods.

(1) Measurement of Retardation Value (R=Δn·d (nm)), K Value

The retardation R value which is the product of birefringence Δn and film thickness d and Nz were measured with the M150 (trade name) spectroscopic ellipsometer of Nippon Bunko Co., Ltd. The R value was measured while incident light was perpendicular to the surface of the film. The K value (nm) was obtained by measuring a retardation value at each angle by changing the angle between incident light and the surface of the film, obtaining 3-D refractive indices $n_x$, $n_y$ and $n_z$ by curve fitting the obtained values based on a known index ellipsoid expression, and inserting them into the following equation (4):

$$K=((n_x+n_y)/2-n_z)*d \quad (4)$$

wherein $n_x$, $n_y$, $n_z$ and d are as defined hereinabove.

(2) Measurement of Water Absorption Coefficient

The water absorption coefficient of the film was measured in accordance with "water absorption coefficients of plastics and method of testing boiling water absorption coefficient" specified in JISK 7209 except that the thickness of the dried film was set to 130±50 μm. The test sample was 50 mm×50 mm square in size and immersed in water heated at 25° C. for 24 hours to measure its weight change. The unit is %.

(3) Measurement of Glass Transition Temperature (Tg) of Polymer

This was measured with the DSC2920 Modulated DSC of TA Instruments Co., Ltd. This measurement was made on a flake or chip not after the molding of a film but after the polymerization of a resin.

(4) Measurement of Film Thickness

This was measured with the electronic micrometer of Anritsu Corporation.

(5) Measurement of Polymer Copolymerization Ratio

This was measured with the JNM-alpha600 proton NMR of JEOL Ltd. In the case of a copolymer of bisphenol A and biscresol fluorene, heavy benzene was used as a solvent and the copolymerization ratio was calculated from the intensity ratio of the protons of the respective methyl groups.

(6) Measurement of Heat Shrinkage Factor

Three rectangular samples having a length of 150 mm in the slow axis direction of the film and a width of 10 mm in a direction perpendicular to the above direction were cut out. The three samples were marked with dots for the measurement of heat shrinkage factor in a lengthwise direction (150 mm) at intervals of 100 mm. They were heated in a high-temperature chamber at 90° C. for 500 hours while tension was not applied thereto, taken out from the chamber at room temperature and cooled for 24 hours to measure the intervals between dots. This measurement was carried out at room temperature (23° C.) with a reading microscope. The heat shrinkage factor was obtained from the following equation (22) and the average value of the three samples was taken as heat shrinkage factor. Heat shrinkage factor (%)=|(size before treatment)−(size after treatment)/(size before treatment)|×100 (22).

(7) Measurement of Residual Solvent in Retardation Film

About 5 g of the retardation film was sampled and dried with a hot air drier at 230° C. for 1 hour to obtain the residue of the solvent in the retardation film from a weight change before and after the treatment.

(8) Measurement of Intrinsic Viscosity of Polymer

The intrinsic viscosity of a polymer was measured in methylene chloride at 20° C. with an Ubbelohde viscometer.

(9) Observation of Frame Phenomenon

The commercially available HLC2-5618 polarizer film of Sanritsu Co., Ltd. was used as a polarizer film, and the polarizer film (0° C.), retardation film (0° C.), glass and polarizer film (90° C.) were joined together with an adhesive layer to prepare a test sample. The angles within the parentheses indicate the in-plane lamination angle of the transmission axis of the polarizer film and the in-plane lamination angle of the slow axis of the retardation film. This test sample was placed on the back light in such a manner that the retardation film was situated on an upper side, and a light leak was observed to see a frame phenomenon in a dark room. The test sample measured 291 mm×362 mm. After lamination, the test sample was heated at 50° C. for 15 minutes under pressure. 24 hours after the test sample was cooled to room temperature, it was observed at a temperature of 23° C. This observation is referred to as "initial evaluation". 500 hours after the test sample was placed in a high-temperature chamber at 60° C., it was taken out from the chamber and left at room temperature for 24 hours to observe a frame phenomenon at room temperature (23° C.). This observation after 500 hours of heating is referred to as "evaluation after 500 hours". The observation of the frame phenomenon was carried out at the beginning and after 500 hours. Since the transmission axis of the polarizer film is perpendicular to the slow axis of the retardation film in the above constitution, if there is no frame phenomenon, a black color is displayed on the entire screen but if there is a strong frame phenomenon, a light leak occurs at the four corners of the test sample. The brightness of the test sample was measured from a direction perpendicular to the test sample with the LS110 brightness meter of Minolta Co., Ltd. The measurement points were about 2 cm away from each corner and the average value of the four measurement data was taken as four-corner brightness. One center point was measured and taken as central brightness. Further, the frame phenomenon was checked with the eye under an illuminance of about 20 lux after 500 hours. When the frame phenomenon was seen, the sample was evaluated as NG and when observation was difficult, the sample was evaluated as OK.

(10) Change of R(550)

The change of the retardation value R(550) was observed at a measurement wavelength of 550 nm after 500 hours of heating at 90° C. The evaluation result is represented by |(initial value)−(after 500 hours)| in Table 1.

The monomer structures of the polycarbonates used in the following Examples and Comparative Examples are shown below.

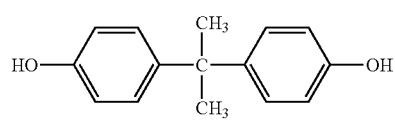
[A]

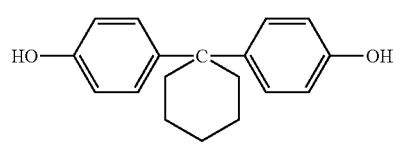
[B]

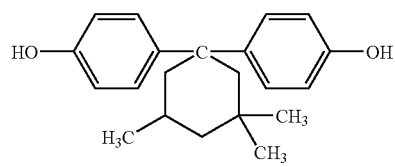
[C]

-continued

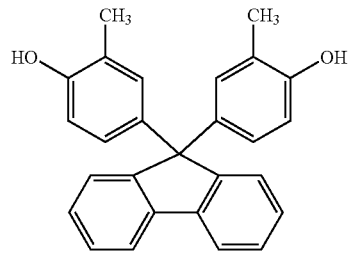
[D]

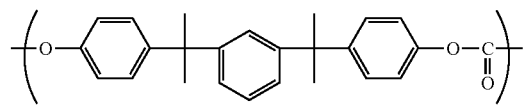
[E]

Example 1

An aqueous solution of sodium hydroxide and ion exchange water were fed to a reactor equipped with a stirrer, thermometer and reflux condenser, monomers [A] and [D] having the above structures were dissolved in the solution in a molar ratio shown in Table 1, and a small amount of hydrosulfite was added to the resulting solution. Methylene chloride was then added to the solution, and phosgene was blown into it at 20° C. in about 60 minutes. Further, p-tert-butylphenol was added to emulsify the solution, and triethylamine was added and stirred at 30° C. for about 3 hours to complete a reaction. After the end of the reaction, an organic phase was dispensed, and methylene chloride was evaporated to obtain a polycarbonate copolymer. The composition of the obtained copolymer was almost the same as the ratio of the charged monomers shown in Table 1.

This copolymer was dissolved in methylene chloride to prepare a dope having a solids content of 18 wt %. A cast film was formed from this dope to obtain an unstretched film. The residue of the solvent in the unstretched film was 0.9 wt %. After this film was stretched to 1.35 times at 220° C. with a transverse uniaxial stretching machine, the draw ratio was reduced to 1.33 times at the last part of the uniaxial stretching machine to carry out heat setting at 222° C. for 7 seconds so as to obtain a uniaxially oriented film. The evaluation results of the characteristic properties of this film are shown in Table 1. The slow axis of this retardation film was existent in a direction (main stretching direction) perpendicular to the flow direction of the transverse uniaxial stretching machine.

Further, a frame test was made on this retardation film. The results are shown in Table 2. It was found that the frame phenomenon of the retardation film was at an insignificant level as shown in Table 2.

For this frame test, the rolled polarizer film and the rolled retardation film were joined together with an adhesive layer by roll-to-roll in such a manner that the transmission axis (perpendicular to the longitudinal direction) of the polarizer film became parallel to the slow axis of the retardation film. When the frame test was also made on this laminate, it was found that the frame phenomenon of the laminate was at an insignificant level as well.

This uniaxially oriented film was evaluated using the commercially available VL-151VA liquid crystal monitor making use of a vertical alignment mode manufactured by Fujitsu Limited. This commercially available liquid crystal display device comprises two retardation films and a liquid crystal cell sandwiched between the retardation films. The retardation film on the front side which was the observer's side of the liquid crystal cell was removed, and the above uniaxially oriented film was laminated on the liquid crystal cell instead in such a manner that the transmission axis (polarization axis) of the polarizer film and the slow axis of the uniaxially oriented film became parallel to each other. The lamination angle between the polarizer film and the liquid crystal cell was made the same as that of the commercially available product. Further, the retardation film on the rear side of the liquid crystal cell of the commercially available product was removed, the above unstretched film was stretched to 1.7 times at 212° C. with a longitudinal uniaxial stretching machine and to 2 times at 220° C. with a transverse uniaxial stretching tenter to obtain a biaxially oriented film (R(550)=3.2 nm, K(550)=192.3 nm), and this biaxially oriented film was laminated on the liquid crystal cell with an adhesive layer therebetween in such a manner that the transmission axis of the polarizer film became parallel to the slow axis of the uniaxially oriented film. The lamination angle between the polarizer film and the liquid crystal cell was made the same as that of the commercially available product. When the viewing angle was checked with the eye, it was found that the viewing angle was wider than that of the commercially available product and that a color shift by the viewing angle could be considerably suppressed.

Example 2

A polycarbonate copolymer was obtained in the same manner as in Example 1 except that monomers shown in Table 1 were used. The composition of the obtained copolymer was almost the same as the ratio of the charged monomers. After a film was formed in the same manner as in Example 1, it was stretched to 1.4 times at 220° C. with a longitudinal uniaxial stretching machine. The draw ratio was then reduced to 1.39 times at the last part of the longitudinal uniaxial stretching machine to carry out heat setting at 221° C. for 8 seconds so as to obtain a uniaxially oriented film. The evaluation results of the characteristic properties of this film are shown in Table 1.

Further, a frame test was made on this uniaxially oriented film. The results are shown in Table 2. It was found that the frame phenomenon of the uniaxially oriented film was at an insignificant level as shown in Table 2.

Example 3

A polycarbonate copolymer was obtained in the same manner as in Example 1 except that monomers shown in Table 1 were used. The composition of the obtained copolymer was almost the same as the ratio of the charged monomers. After a film was formed in the same manner as in Example 1, it was stretched to 1.2 times at 233° C. with a longitudinal uniaxial stretching machine. Without reducing the draw ratio at the last part of the longitudinal uniaxial stretching machine, heat setting was carried out at 240° C. for 10 seconds to obtain a uniaxially oriented film. The evaluation results of the characteristic properties of this film are shown in Table 1.

Further, a frame test was made on this uniaxially oriented film. The results are shown in Table 2. It was found that the frame phenomenon of the uniaxially oriented film was at an insignificant level as shown in Table 2.

Comparative Example 1

A polycarbonate copolymer was obtained in the same manner as in Example 1 except that monomers shown in Table 1 were used. The composition of the obtained copolymer was almost the same as the ratio of the charged monomers. A film was formed by changing drying conditions from those of Example 1, and the residue of the solvent in the unstretched film was adjusted to 3 wt %. This film was stretched to 1.3 times at 200° C. with a longitudinal uniaxial stretching machine to obtain a uniaxially oriented film. The evaluation results of the characteristic properties of this film are shown in Table 1.

Further, a frame test was made on this uniaxially oriented film. The results are shown in Table 2. The frame phenomenon of this uniaxially oriented film was confirmed with the eye as shown in Table 2. It was found that a change in brightness was large at the four corners after a durability test and therefore a retardation film of interest could not be obtained.

Comparative Example 2

A polycarbonate homopolymer was obtained in the same manner as in Example 1 except that a monomer shown in Table 1 was used. The composition of the obtained homopolymer was almost the same as the ratio of the charged monomer. After a film was formed in the same manner as in Example 1, it was stretched to 1.3 times at 156° C. with a longitudinal uniaxial stretching machine. The draw ratio was then reduced to 1.29 times at the last part of the longitudinal uniaxial stretching machine to carry out heat setting at 170° C. for 10 seconds so as to obtain a uniaxially oriented film. The evaluation results of the characteristic properties of this film are shown in Table 1.

Further, a frame test was made on this uniaxially oriented film. The results are shown in Table 2. The frame phenomenon of this uniaxially oriented film was confirmed with the eye as shown in Table 2. It was found that the difference in brightness between the center and the four corners was large even at the beginning and became larger after the durability test, and therefore a retardation film of interest could not be obtained.

TABLE 1

|  | Ex. 1 | Ex. 2 | Ex. 3 | C. Ex. 1 | C. Ex. 2 |
| --- | --- | --- | --- | --- | --- |
| Structure of monomer 1 | [A] | [B] | [C] | [A] | [A] |
| (mol % of charged monomer) | (50) | (55) | (53) | (50) | (100) |
| Structure of monomer 2 | [D] | [D] | [D] | [D] |  |
| (mol % of charged monomer) | (50) | (45) | (47) | (50) |  |
| Heat shrinkage factor (%) | 0.05 | 0.06 | 0.06 | 0.20 | 0.09 |
| Glass transition temperature (° C.) | 210 | 211 | 230 | 210 | 156 |
| R(450) (nm) | 112.9 | 148.2 | 99.4 | 115.9 | 322.5 |

TABLE 1-continued

|  | Ex. 1 | Ex. 2 | Ex. 3 | C. Ex. 1 | C. Ex. 2 |
|---|---|---|---|---|---|
| R(550) (nm) | 109.6 | 145.3 | 96.5 | 112.5 | 298.6 |
| R(450)/R(550) | 1.03 | 1.02 | 1.03 | 1.03 | 1.08 |
| K(550) (nm) | 54.6 | 72.7 | 48.3 | 56.2 | 149.3 |
| Film thickness after stretching (μm) | 75 | 70 | 67 | 87 | 76 |
| Residue of solvent (%) | 0.3 | 0.4 | 0.4 | 1.2 | 0.1 |
| Water absorption coefficient (wt %) | 0.2 | 0.2 | 0.2 | 0.2 | 0.2 |
| Intrinsic viscosity (dl/g) | 0.78 | 0.92 | 0.65 | 0.78 | 0.78 |
| Change in R(550) | 0.6 | 1.2 | 1.0 | 3.6 | 2.9 |

Ex. = Example,
C. Ex. = Comparative Example

TABLE 2

|  | Initial evaluation (cd/m$^2$) | | Evaluation after 500 hours (cd/m$^2$) | | Visual |
|---|---|---|---|---|---|
|  | Four-corner brightness | Central brightness | Four-corner brightness | Central brightness | evaluation |
| Ex. 1 | 0.35 | 0.33 | 0.36 | 0.34 | OK |
| Ex. 2 | 0.37 | 0.34 | 0.38 | 0.35 | OK |
| Ex. 3 | 0.36 | 0.34 | 0.38 | 0.35 | OK |
| C. Ex. 1 | 0.35 | 0.32 | 0.50 | 0.33 | NG |
| C. Ex. 2 | 0.46 | 0.35 | 0.71 | 0.37 | NG |

Ex. = Example,
C. Ex. = Comparative Example

Example 4

An aqueous solution of sodium hydroxide and ion exchange water were fed to a reactor equipped with a stirrer, thermometer and reflux condenser, monomers [A] and [D] having the above structures were dissolved in the solution in a molar ratio shown in Table 3, and a small amount of hydrosulfite was added to the resulting solution. Methylene chloride was then added to the solution, and phosgene was blown into it at 20° C. in about 60 minutes. Further, p-tert-butylphenol was added to emulsify the solution, and triethylamine was added and stirred at 30° C. for about 3 hours to complete a reaction. After the end of the reaction, an organic phase was dispensed, and methylene chloride was evaporated to obtain a polycarbonate copolymer. The composition of the obtained copolymer was almost the same as the ratio of the charged monomers shown in Table 3.

This copolymer was dissolved in methylene chloride to prepare a dope having a solids content of 18 wt %. A cast film was formed from this dope to obtain an unstretched film. The residue of the solvent in the unstretched film was 0.8 wt %. Further, this film was stretched to 1.4 times at 212° C. with a longitudinal uniaxial stretching machine and to 2.0 times at 225° C. with a transverse uniaxial stretching tenter. The draw ratio was then reduced to 1.95 times at the last part of the transverse uniaxial stretching machine to carry out heat setting at 225° C. for 10 seconds so as to obtain a biaxially oriented retardation film. The evaluation results of the characteristic properties of this film are shown in Table 3. The slow axis of this biaxially oriented retardation film was existent in a direction (main stretching direction) perpendicular to the flow direction of the transverse uniaxial stretching machine.

Further, a frame test was made on this biaxially oriented retardation film. The results are shown in Table 4. It was found that the frame phenomenon of the biaxially oriented retardation film was at an insignificant level as shown in Table 4.

For this frame test, the rolled polarizer film and the rolled biaxially oriented retardation film were joined together with an adhesive layer by roll-to-roll in such a manner that the transmission axis (perpendicular to the longitudinal direction) of the polarizer film became parallel to the slow axis of the biaxially oriented retardation film. When the frame test was also made on this laminate, it was found that the frame phenomenon of the laminate was at an insignificant level as well.

This biaxially oriented retardation film was evaluated using the commercially available VL-151VA liquid crystal monitor making use of a vertical alignment mode manufactured by Fujitsu Limited. This commercially available liquid crystal display device comprises two retardation films and a liquid crystal cell sandwiched between the retardation films. The above biaxially oriented retardation film was laminated in place of these retardation films in such a manner that the transmission axis of the polarizer film and the slow axis of the biaxially oriented retardation film became parallel to each other. The lamination angle of the polarizer film was made the same as that of the commercially available product. When the viewing angle was checked with the eye, it was found that the viewing angle was wider than that of the commercially available product and that a color shift by the viewing angle could be considerably suppressed.

Example 5

A polycarbonate copolymer was obtained in the same manner as in Example 4 except that monomers shown in Table 3 were used. The composition of the obtained copolymer was almost the same as the ratio of the charged monomers. After a film was formed in the same manner as in Example 4, it was stretched to 1.3 times at 214° C. with a longitudinal uniaxial stretching machine and then to 2.0 times at 227° C. with a transverse uniaxial stretching tenter. The draw ratio was then reduced to 1.95 times at the last part of the transverse uniaxial stretching machine to carry out heat setting at 227° C. for 10 seconds so as to obtain a biaxially oriented retardation film. The evaluation results of the characteristic properties of this film are shown in Table 3.

Further, a frame test was made on this biaxially oriented retardation film. The results are shown in Table 4. It was found that the frame phenomenon of the biaxially oriented retardation film was at an insignificant level as shown in Table 4.

Example 6

A polycarbonate copolymer was obtained in the same manner as in Example 4 except that monomers shown in Table 3 were used. The composition of the obtained copolymer was almost the same as the ratio of the charged monomers. After a film was formed in the same manner as in Example 4, it was stretched to 1.3 times at 233° C. with a longitudinal uniaxial stretching machine and then to 2.0 times at 240° C. with a transverse uniaxial stretching tenter. Without reducing the draw ratio at the last part of the transverse uniaxial stretching machine, heat setting was carried out at 245° C. for 10 seconds to obtain a biaxially oriented retardation film. The evaluation results of the characteristic properties of this film are shown in Table 3.

Further, a frame test was made on this biaxially oriented retardation film. The results are shown in Table 4. It was found that the frame phenomenon of the biaxially oriented retardation film was at an insignificant level as shown in Table 4.

Example 7

A polycarbonate copolymer was obtained in the same manner as in Example 4 except that monomers shown in Table 3 were used. The composition of the obtained copolymer was almost the same as the ratio of the charged monomers. After a film was formed in the same manner as in Example 4, it was stretched to 1.6 times at 169° C. with a longitudinal uniaxial stretching machine and then to 2.2 times at 170° C. with a transverse uniaxial stretching tenter. The draw ratio was then reduced to 2.15 times at the last part of the transverse uniaxial stretching machine to carry out heat setting at 171° C. for 10 seconds so as to obtain a biaxially oriented retardation film. The evaluation results of the characteristic properties of this film are shown in Table 3. The slow axis of this biaxially oriented retardation film was existent in a direction (main stretching direction) perpendicular to the flow direction of the transverse uniaxial stretching machine.

Further, a frame test was made on this biaxially oriented retardation film. The results are shown in Table 4. It was found that the frame phenomenon of the biaxially oriented retardation film was at an insignificant level as shown in Table 4.

For this frame test, the rolled polarizer film and the rolled biaxially oriented retardation film were joined together with an adhesive layer in such a manner that the transmission axis (perpendicular to the longitudinal direction) of the polarizer film became parallel to the slow axis of the biaxially oriented retardation film. When the frame test was also made on this laminate, it was found that the frame phenomenon of the laminate was at an insignificant level as well.

This biaxially oriented retardation film was evaluated using the commercially available VL-151VA liquid crystal monitor making use of a vertical alignment mode manufactured by Fujitsu Limited. This commercially available liquid crystal display device comprises two retardation films and a liquid crystal cell sandwiched between the retardation films. The above biaxially oriented retardation film was laminated on only the polarizer on the observer's side in place of the retardation film in such a manner that the transmission axis of the polarizer film and the slow axis of the biaxially oriented retardation film became parallel to each other, and only the polarizer was existent on the rear side. The lamination angle of the polarizer film was made the same as that of the commercially available product. When the viewing angle was checked with the eye, it was found that the viewing angle was wider than that of the commercially available product and that a color shift by the viewing angle could be considerably suppressed.

Comparative Example 3

A polycarbonate copolymer was obtained in the same manner as in Example 4 except that monomers shown in Table 3 were used. The composition of the obtained copolymer was almost the same as the ratio of the charged monomers. A film was formed by changing drying conditions from those of Example 4, and the residue of the solvent in the unstretched film was adjusted to 3 wt %. This film was stretched to 1.3 times at 200° C. with a longitudinal uniaxial stretching machine and then to 2.0 times at 210° C. with a transverse uniaxial stretching tenter to obtain a biaxially oriented retardation film. The evaluation results of the characteristic properties of this film are shown in Table 3.

Further, a frame test was made on this biaxially oriented retardation film. The results are shown in Table 4. A frame phenomenon was confirmed with the eye in the biaxially oriented retardation film. It was found that a change in brightness after a durability test was large at the four corners as shown in Table 4 and therefore a biaxially oriented retardation film of interest could not be obtained.

Comparative Example 4

A polycarbonate copolymer was obtained in the same manner as in Example 4 except that monomers shown in Table 3 were used. The composition of the obtained copolymer was almost the same as the ratio of the charged monomers. After a film was formed in the same manner as in Example 4, it was stretched to 1.3 times at 156° C. with a longitudinal uniaxial stretching machine and then to 1.7 times at 172° C. with a transverse uniaxial stretching tenter. The draw ratio was then reduced to 1.65 times at the last part of the transverse uniaxial stretching machine to carry out heat setting at 170° C. for 10 seconds so as to obtain a biaxially oriented retardation film. The evaluation results of the characteristic properties of this film are shown in Table 3.

Further, a frame test was made on this biaxially oriented retardation film. The results are shown in Table 4. A frame phenomenon was confirmed with the eye in the biaxially oriented retardation film as shown in Table 4. It was found that the difference in brightness between the center and the four corners was large even at the beginning and became larger after a durability test, and therefore a biaxially oriented retardation film of interest could not be obtained.

TABLE 3

|  | Ex. 4 | Ex. 5 | Ex. 6 | Ex. 7 | C. Ex. 3 | C. Ex. 4 |
|---|---|---|---|---|---|---|
| Structure of monomer 1 | [A] | [B] | [C] | [E] | [A] | [A] |
| (mol % of charged monomer) | (50) | (55) | (53) | (50) | (50) | (100) |
| Structure of monomer 2 | [D] | [D] | [D] | [D] | [D] |  |
| (mol % of charged monomer) | (50) | (45) | (47) | (50) | (50) |  |
| Heat shrinkage factor (%) | 0.07 | 0.08 | 0.07 | 0.08 | 0.20 | 0.09 |
| Glass transition temperature (° C.) | 210 | 211 | 230 | 170 | 210 | 156 |
| R(450) (nm) | 42.4 | 33.2 | 21.9 | 53.6 | 39.8 | 43.7 |
| R(550) (nm) | 41.3 | 32.5 | 21.3 | 53.1 | 38.6 | 40.5 |
| R(450)/R(550) | 1.03 | 1.02 | 1.03 | 1.01 | 1.03 | 1.08 |
| K(550) (nm) | 135.9 | 128.1 | 120.6 | 227.5 | 100.5 | 99.6 |
| Film thickness after stretching (μm) | 62 | 69 | 65 | 40 | 63 | 76 |
| Residue of solvent (%) | 0.3 | 0.5 | 0.3 | 0.2 | 1.2 | 0.1 |
| Water absorption coefficient (wt %) | 0.2 | 0.2 | 0.2 | 0.2 | 0.2 | 0.2 |
| Intrinsic viscosity (dl/g) | 0.77 | 0.91 | 0.66 | 0.71 | 0.77 | 0.78 |
| Change in R(550) | 1.9 | 1.6 | 2.1 | 2.2 | 3.9 | 2.9 |

Ex. = Example,
C. Ex. = Comparative Example

TABLE 4

|  | Initial evaluation (cd/m$^2$) | | Evaluation after 500 hours (cd/m$^2$) | | Visual |
|---|---|---|---|---|---|
|  | Four-corner brightness | Central brightness | Four-corner brightness | Central brightness | evaluation |
| Ex. 4 | 0.34 | 0.33 | 0.36 | 0.33 | OK |
| Ex. 5 | 0.36 | 0.34 | 0.38 | 0.34 | OK |
| Ex. 6 | 0.37 | 0.36 | 0.39 | 0.35 | OK |
| Ex. 7 | 0.35 | 0.33 | 0.38 | 0.34 | OK |
| C. Ex. 3 | 0.34 | 0.31 | 0.49 | 0.33 | NG |
| C. Ex. 4 | 0.43 | 0.35 | 0.68 | 0.39 | NG |

Ex. = Example,
C. Ex. = Comparative Example

Example 8

An aqueous solution of sodium hydroxide and ion exchange water were fed to a reactor equipped with a stirrer, thermometer and reflux condenser, monomers [A] and [D] having the above structures were dissolved in the solution in a molar ratio shown in Table 5, and a small amount of hydrosulfite was added to the resulting solution. Methylene chloride was then added to the solution, and phosgene was blown into it at 20° C. in about 60 minutes. Further, p-tert-butylphenol was added to emulsify the solution, and triethylamine was added and stirred at 30° C. for about 3 hours to complete a reaction. After the end of the reaction, an organic phase was dispensed, and methylene chloride was evaporated to obtain a polycarbonate copolymer. The composition of the obtained copolymer was almost the same as the ratio of the charged monomers shown in Table 6.

This copolymer was dissolved in methylene chloride to prepare a dope having a solids content of 18 wt %. A cast film was formed from this dope to obtain an unstretched film. The residue of the solvent in the unstretched film was 0.9 wt %. Further, this film was stretched to 1.3 times at 212° C. with a longitudinal uniaxial stretching machine and to 1.42 times at 220° C. with a transverse uniaxial stretching tenter. The draw ratio was then reduced to 1.40 times at the last part of the transverse uniaxial stretching machine to carry out heat setting at 220° C. for 10 seconds so as to obtain a biaxially oriented retardation film. The evaluation results of the characteristic properties of this film are shown in Table 5. The slow axis of this biaxially oriented retardation film was existent in a direction (main stretching direction) perpendicular to the flow direction of the transverse uniaxial stretching machine.

Further, a frame test was made on this biaxially oriented retardation film. The results are shown in Table 6. It was found that the frame phenomenon of the biaxially oriented retardation film was at an insignificant level as shown in Table 6.

For this frame test, the rolled polarizer film and the rolled biaxially oriented retardation film were joined together with an adhesive layer by roll-to-roll in such a manner that the transmission axis (perpendicular to the longitudinal direction) of the polarizer film became parallel to the slow axis of the biaxially oriented retardation film. When the frame test was also made on this laminate, it was found that the frame phenomenon of the laminate was at an insignificant level as well.

This biaxially oriented retardation film was evaluated using the commercially available VL-151VA liquid crystal monitor making use of a vertical alignment mode manufactured by Fujitsu Limited. This commercially available liquid crystal display device comprises two retardation films and a liquid crystal cell sandwiched between the retardation films. The retardation film on the rear side opposite to the observer's side of the liquid crystal cell was removed, and the above biaxially oriented retardation film was laminated on the liquid crystal cell instead in such a manner that the transmission axis of the polarizer film and the slow axis of the biaxially oriented retardation film became parallel to each other. The lamination angle between the polarizer film and the liquid crystal cell was made the same as that of the commercially available product. Further, the retardation film on the front side of the liquid crystal cell of the commercially available product was also removed, a retardation film prepared by stretching the above unstretched film to 1.2 times at 212° C. uniaxially in a longitudinal direction (R(550)=105 nm, K(550)=52 nm) was laminated on the liquid crystal cell with an adhesive layer therebetween in such a manner that the transmission axis of the polarizer film became parallel to the slow axis of the retardation film. The lamination angle between the polarizer film and the liquid crystal cell was made the same as that of the commercially available product. When the viewing angle was checked with the eye, it was found that the viewing angle was wider than that of the commercially available product and that a color shift by the viewing angle could be considerably suppressed.

Example 9

A polycarbonate copolymer was obtained in the same manner as in Example 8 except that monomers shown in Table 5 were used. The composition of the obtained copolymer was almost the same as the ratio of the charged monomers. After a film was formed in the same manner as in Example 8, it was stretched to 1.2 times at 214° C. with a longitudinal uniaxial stretching machine and then to 1.21 times at 221° C. with a transverse uniaxial stretching tenter. The draw ratio was then reduced to 1.2 times at the last part of the transverse uniaxial stretching machine to carry out heat setting at 221° C. for 10 seconds so as to obtain a biaxially oriented retardation film. The evaluation results of the characteristic properties of this film are shown in Table 5.

Further, a frame test was made on this biaxially oriented retardation film. The results are shown in Table 6. It was found that the frame phenomenon of the biaxially oriented retardation film was at an insignificant level as shown in Table 6.

Example 10

A polycarbonate copolymer was obtained in the same manner as in Example 8 except that monomers shown in Table 5 were used. The composition of the obtained copolymer was almost the same as the ratio of the charged monomers. After a film was formed in the same manner as in Example 8, it was stretched to 1.2 times at 233° C. with a longitudinal uniaxial stretching machine and then to 1.21 times at 238° C. with a transverse uniaxial stretching tenter. Without reducing the draw ratio at the last part of the transverse uniaxial stretching machine, heat setting was carried out at 240° C. for 10 seconds to obtain a biaxially oriented retardation film. The evaluation results of the characteristic properties of this film are shown in Table 5.

Further, a frame test was made on this biaxially oriented retardation film. The results are shown in Table 6. It was found that the frame phenomenon of the biaxially oriented retardation film was at an insignificant level as shown in Table 6.

Comparative Example 5

A polycarbonate copolymer was obtained in the same manner as in Example 8 except that monomers shown in Table 5 were used. The composition of the obtained copolymer was almost the same as the ratio of the charged monomers. A film was formed by changing drying conditions from those of Example 8, and the residue of the solvent in the unstretched film was adjusted to 3 wt %. This film was stretched to 1.2 times at 200° C. with a longitudinal uniaxial stretching machine and then to 1.3 times at 210° C. with a transverse uniaxial stretching tenter to obtain a biaxially oriented retardation film. The evaluation results of the characteristic properties of this film are shown in Table 5.

Further, a frame test was made on this biaxially oriented retardation film. The results are shown in Table 6. A frame phenomenon was confirmed with the eye in the biaxially oriented retardation film as shown in Table 6. It was found that a change in brightness after a durability test was large at the four corners and therefore a biaxially oriented retardation film of interest could not be obtained.

Comparative Example 6

A polycarbonate homopolymer was obtained in the same manner as in Example 8 except that monomers shown in Table 5 were used. The composition of the obtained homopolymer was almost the same as the ratio of the charged monomers. After a film was formed in the same manner as in Example 8, it was stretched to 1.1 times at 156° C. with a longitudinal uniaxial stretching machine and then to 1.13 times at 172° C. with a transverse uniaxial stretching tenter. The draw ratio was then reduced to 1.11 times at the last part of the transverse uniaxial stretching machine to carry out heat setting at 170° C. for 10 seconds so as to obtain a biaxially oriented retardation film. The evaluation results of the characteristic properties of this film are shown in Table 5.

Further, a frame test was made on this biaxially oriented retardation film. The results are shown in Table 6. A frame phenomenon was confirmed with the eye in the biaxially oriented retardation film as shown in Table 6. It was found that the difference in brightness between the center and the four corners was large even at the beginning and became larger after a durability test. Therefore, a biaxially oriented retardation film of interest could not be obtained.

TABLE 5

|  | Ex. 8 | Ex. 9 | Ex. 10 | C. Ex. 5 | C. Ex. 6 |
| --- | --- | --- | --- | --- | --- |
| Structure of monomer 1 | [A] | [B] | [C] | [A] | [A] |
| (mol % of charged monomer) | (50) | (55) | (53) | (50) | (100) |
| Structure of monomer 2 | [D] | [D] | [D] | [D] |  |
| (mol % of charged monomer) | (50) | (45) | (47) | (50) |  |
| Heat shrinkage factor (%) | 0.06 | 0.08 | 0.07 | 0.21 | 0.09 |
| Glass transition temperature (° C.) | 210 | 211 | 230 | 210 | 156 |
| R(450) (nm) | 3.19 | 1.55 | 6.14 | 4.39 | 13.29 |
| R(550) (nm) | 3.10 | 1.52 | 5.96 | 4.26 | 12.31 |
| R(450)/R(550) | 1.03 | 1.02 | 1.03 | 1.03 | 1.08 |
| K(550) (nm) | 201.9 | 95.8 | 112.6 | 132.8 | 135.4 |

TABLE 5-continued

|  | Ex. 8 | Ex. 9 | Ex. 10 | C. Ex. 5 | C. Ex. 6 |
|---|---|---|---|---|---|
| Film thickness after stretching (μm) | 80 | 71 | 69 | 85 | 79 |
| Residue of solvent (%) | 0.3 | 0.5 | 0.4 | 1.2 | 0.1 |
| Water absorption coefficient (wt %) | 0.2 | 0.2 | 0.2 | 0.2 | 0.2 |
| Intrinsic viscosity (dl/g) | 0.78 | 0.92 | 0.65 | 0.78 | 0.78 |
| Change in R(550) | 0.7 | 1.3 | 0.9 | 3.7 | 2.9 |

Ex. = Example,
C. Ex. = Comparative Example

TABLE 6

| | Initial evaluation (cd/m$^2$) | | Evaluation after 500 hours (cd/m$^2$) | | Visual |
|---|---|---|---|---|---|
| | Four-corner brightness | Central brightness | Four-corner brightness | Central brightness | evaluation |
| Ex. 8 | 0.35 | 0.33 | 0.36 | 0.34 | OK |
| Ex. 9 | 0.37 | 0.34 | 0.38 | 0.34 | OK |
| Ex. 10 | 0.36 | 0.35 | 0.38 | 0.36 | OK |
| C. Ex. 5 | 0.35 | 0.31 | 0.51 | 0.32 | NG |
| C. Ex. 6 | 0.46 | 0.35 | 0.69 | 0.38 | NG |

Ex. = Example,
C. Ex. = Comparative Example

As having been described above, according to the present invention, it is possible to provide a retardation film which has excellent viewing angle characteristics and rarely sees a frame phenomenon in a liquid crystal display device, particularly a vertical alignment mode liquid crystal display device, while maintaining the excellent properties of a polycarbonate such as moldability, impact resistance and rupture resistance, by stretching a polycarbonate having a specific structure uniaxially or biaxially as a polymer to obtain a uniaxially or biaxially oriented film having specific physical properties. When this retardation film of the present invention is used in a liquid crystal display device together with a polarizer film, there can be provided a liquid crystal display device which rarely experiences display nonuniformity and solves a frame problem.

What is claimed is:

1. A uni- or bi-axially oriented film
   (A) which comprises a polymer or polymer mixture containing a recurring unit represented by the following formula (I):

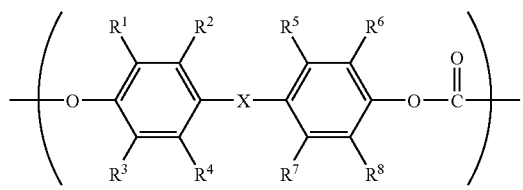

wherein $R^1$ to $R^8$ are each independently a member selected from the group consisting of hydrogen atom, halogen atom, hydrocarbon group having 1 to 6 carbon atoms and hydrocarbon-O— group having 1 to 6 carbon atoms, and X is represented by the following formula (1)-1:

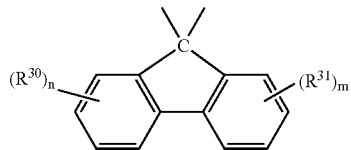

wherein $R^{30}$ and $R^{31}$ are each independently a halogen atom or alkyl group having 1 to 3 carbon atoms, and n and m are each independently an integer of 0 to 4,
   each of the polymer and the polymer mixture containing the recurring unit represented by the above formula (I) in an amount of more than 30 mol % and up to 60 mol % based on the total of all the recurring units of the polymer or polymer mixture and having a glass transition temperature of 165° C. or higher,
   (B) which has a heat shrinkage factor when it is heated at 90° C. for 500 hours under no load of 0.1% or less obtained by heat setting after stretching, and
   (C) which satisfies the following formula (1):

$$1 \leq R(450)/R(550) \leq 1.06 \quad (1)$$

wherein R(450) and R(550) are retardations within the film plane at wavelengths of 450 nm and 550 nm, respectively.

2. The film of claim 1 which is a uniaxially oriented film further satisfying the following expressions (2) and (3) at the same time:

$$R(550) > K(550) \quad (2)$$

$$R(550) > 20 \text{ nm} \quad (3)$$

wherein R(550) is as defined in the above expression (1) and K(550) is a value (rim) defined by the following expression (4) at a wavelength of 550 nm:

$$K = [(n_x + n_y)/2 - n_z] \times d \quad (4)$$

wherein $n_x$, $n_y$ and $n_z$ are refractive indices in x axis, y axis and z axis directions of the film, respectively, and d is the thickness (nm) of the film.

3. The film of claim 1 which is a biaxially oriented film further satisfying the following expression (2') and expression (3) at the same time:

$$R(550) \leq K(550) \quad (2')$$

$$R(550) > 20 \text{ nm} \quad (3)$$

wherein R(550) is as defined in the above expression (1) and K(550) is a value (nm) defined by the following expression (4) at a wavelength of 550 nm:

$$K=[(n_x+n_y)/2-n_z] \times d \quad (4)$$

wherein $n_x$, $n_y$ and $n_z$ are refractive indices in x axis, y axis and z axis directions of the film, respectively, and d is the thickness (nm) of the film.

4. The film of claim 3 which satisfies the following expression (1'):

$$1 \leq R(450)/R(550) \leq 1.05 \quad (1')$$

wherein R(450) and R(550) are as defined in the above expressions.

5. The film of claim 1 which is a biaxially oriented film further satisfying the following expression (2'), the following expression (3') and the following expression (5) at the same time:

$$R(550) \leq K(550) \quad (2')$$

$$R(550) \leq 20 \text{ nm} \quad (3')$$

$$K(550) \geq 50 \text{ nm} \quad (5)$$

wherein R(550) is as defined in the above expression (1) and K(550) is a value (nm) defined by the following expression (4) at a wavelength of 550 nm:

$$K=[(n_x+n_y)/2-n_z] \times d \quad (4)$$

wherein $n_x$, $n_y$ and $n_z$ are refractive indices in x axis, y axis and z axis directions of the film, respectively, and d is the thickness (nm) of the film.

6. The film of claim 1, wherein the polymer or polymer mixture has a glass transition temperature of 200° C. or higher.

7. The film of claim 1 which is a retardation film.

8. A laminated polarizer film which comprises the film of any one of claims 1 and 2 to 5 and a polarizer film in a laminated form.

9. The laminated polarizer film of claim 8 which is laminated in such a manner that the transmission axis of the polarizer film becomes parallel to the slow axis within the plane of the film.

10. A liquid crystal display device comprising the laminated polarizer film of claim 8.

11. The liquid crystal display device of claim 10 which is in a vertical alignment mode.

* * * * *